United States Patent
Tonkowich et al.

[15] 3,670,836
[45] June 20, 1972

[54] ANTI-THEFT DEVICE FOR MOTOR VEHICLES

[72] Inventors: William Tonkowich; John A. Meditz, both of Franklin Lakes; Paul Vignola, Parsippany, all of N.J.

[73] Assignee: Safetech, Inc., Fairfield, N.J.

[22] Filed: July 31, 1970

[21] Appl. No.: 59,871

[52] U.S. Cl..................180/114, 137/552.5, 137/384.4, 70/57, 70/229, 307/10
[51] Int. Cl........................................................B60r 25/04
[58] Field of Search..............180/114, 82; 317/134; 307/10; 137/384.4, 552.5; 70/242, 243, 57, 229; 251/141

[56] References Cited

UNITED STATES PATENTS

| | | | |
|---|---|---|---|
| 2,022,725 | 12/1935 | Lazarus et al | 123/198 |
| 3,411,046 | 11/1968 | Swannick | 317/134 |
| 3,515,340 | 6/1970 | Mika | 317/134 X |
| 1,542,445 | 6/1925 | Grauel | 70/243 |
| 2,594,559 | 4/1952 | Hopkins | 137/384.4 X |
| 3,524,989 | 8/1970 | Pecott | 180/114 |
| 3,544,804 | 12/1970 | Gaumer et al. | 317/134 X |
| 3,559,593 | 2/1971 | Munton et al | 317/134 X |

Primary Examiner—Kenneth H. Betts
Attorney—Norman N. Holland

[57] ABSTRACT

The invention is an electro-mechanical device which is incorporated in the fuel supply system of engine driven vehicles or other engine driven devices to prevent theft or unauthorized use of the vehicle or device. A valve is included in the fuel supply system which cuts off fuel flow except when it is opened by a coded electrical valve control system. The entire anti-theft device is mechanically secure and tamperproof so that it cannot be removed or bypassed by mechanical manipulations without a great deal of effort. The electrical valve control system is made electrically secure and tamperproof so that it cannot bypass or otherwise operated without using the predetermined control code.

11 Claims, 7 Drawing Figures

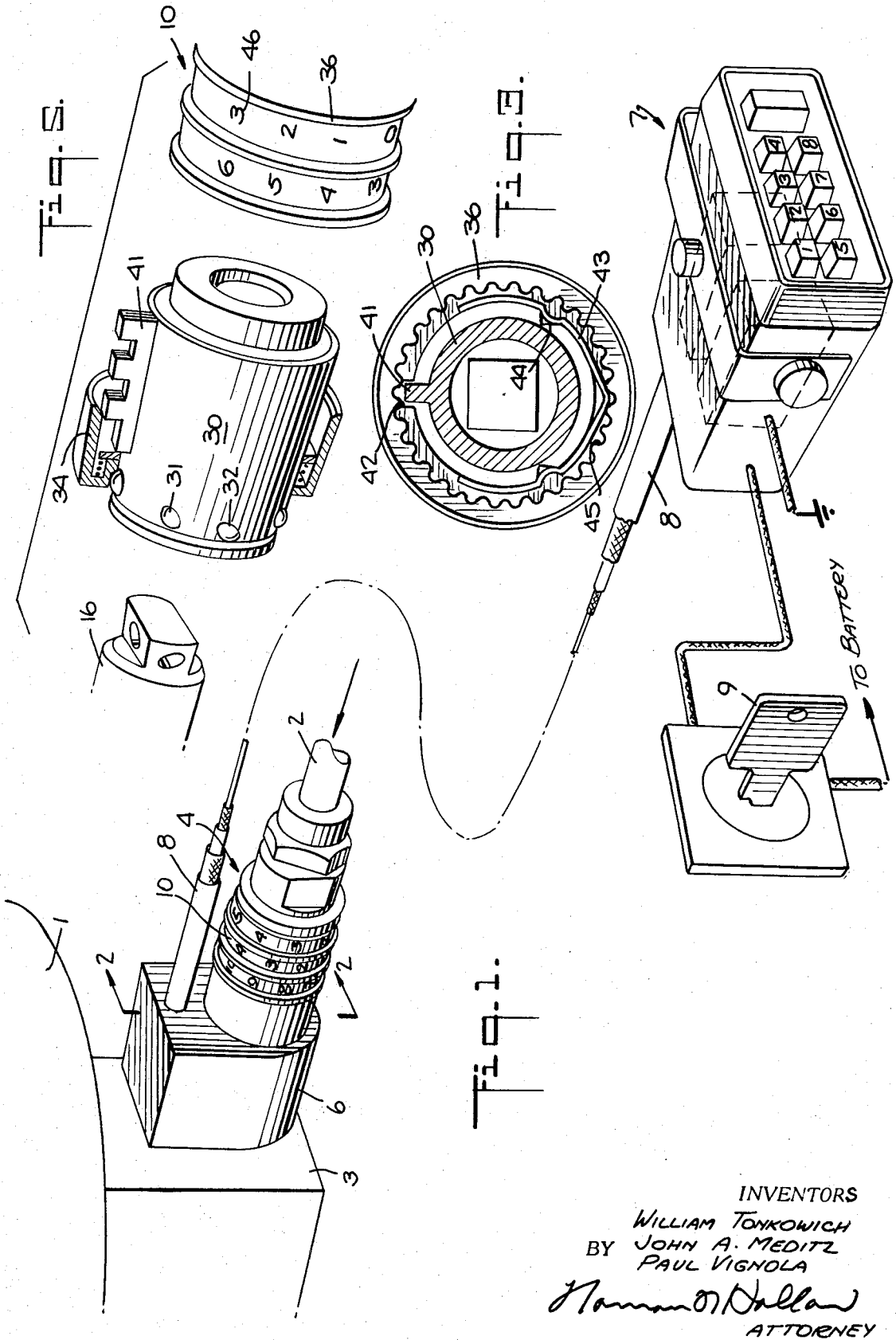

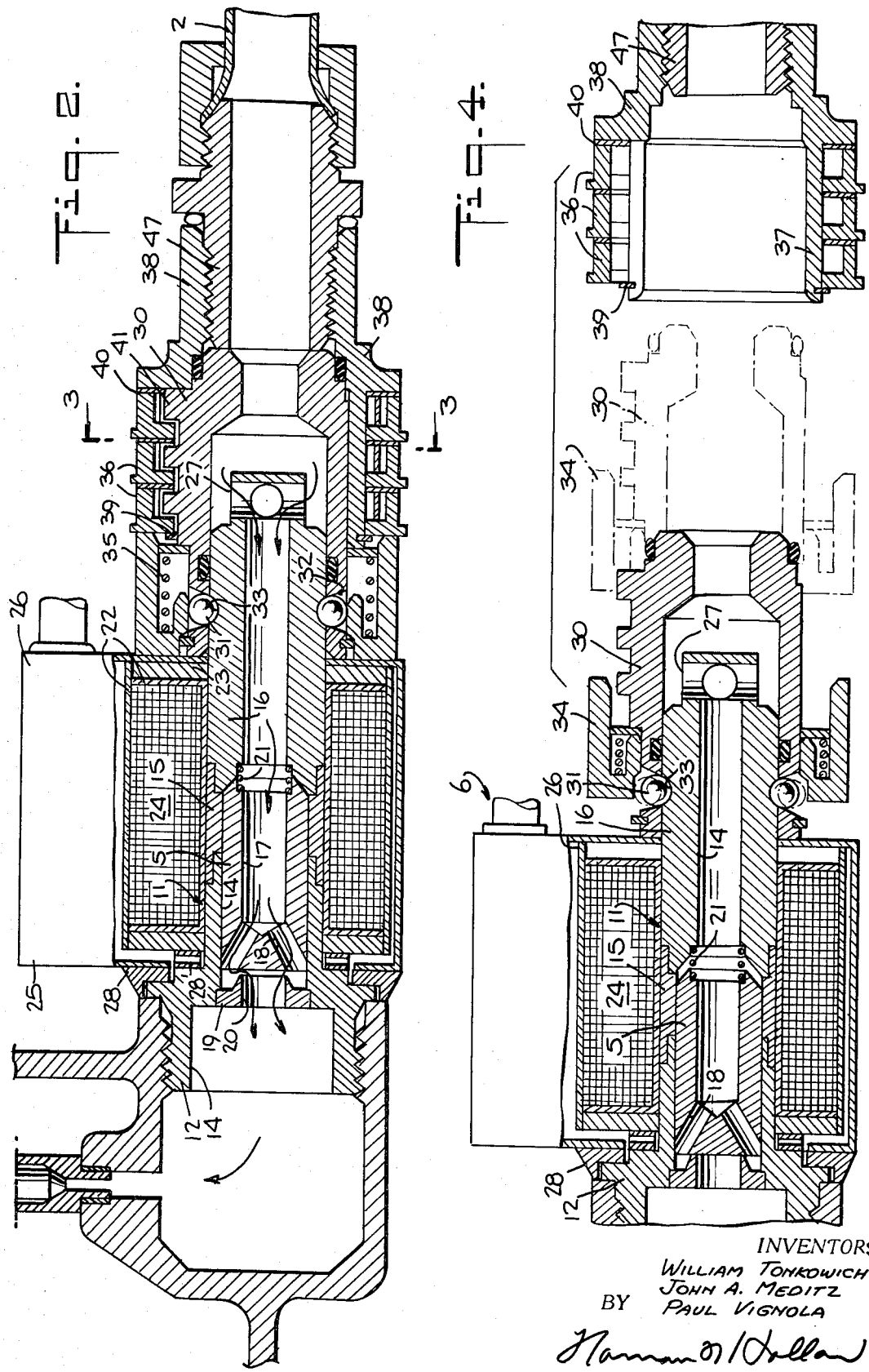

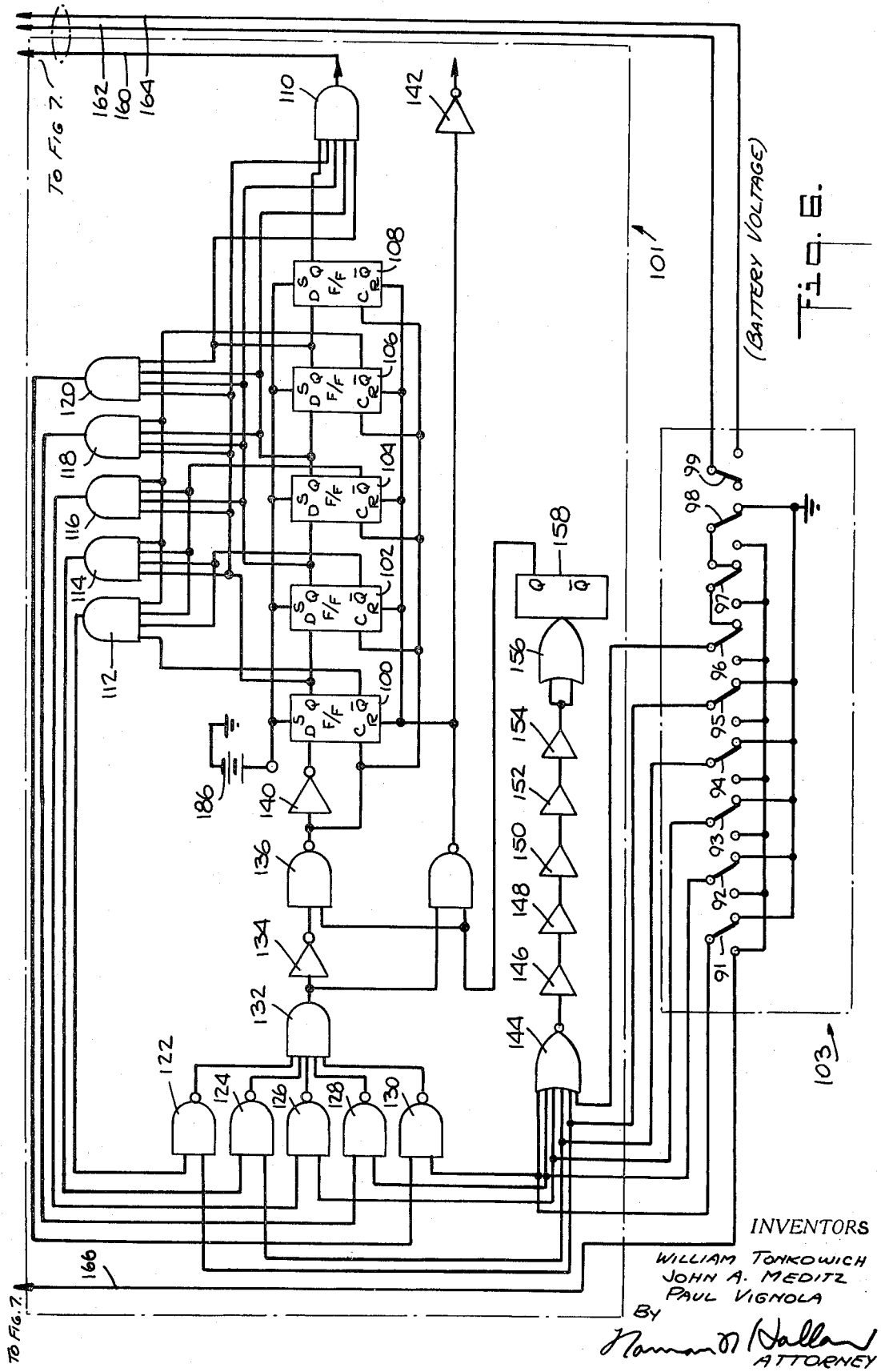

ANTI-THEFT DEVICE FOR MOTOR VEHICLES

BACKGROUND OF THE INVENTION

The present device is provided for preventing the unauthorized use of or theft of vehicles and other devices operated by fluid fuel powered motors. Thefts and other unauthorized uses of motor vehicles are increasing at a rapid rate and increasingly sophisticated techniques are being employed by the thieves for bypassing or inactivating presently used locks and other vehicle security systems.

The wide distribution of duplicate and master keys has made ordinary vehicle locks ineffective. Additionally, various jumpers and other lock bypassing devices have been developed for starting and operating most motor vehicles. The device of the present invention overcomes these drawbacks by providing a theft-proof motor control including a code operated device which supplements the key operated lock.

The new device includes a fuel shutoff valve inserted in the fuel line for the engine which cannot be removed mechanically without destroying the carburetor or other fuel feeding system. The fuel shutoff valve itself is electrically operated by means of a coded electrical valve control system which is also tamperproof so that it may not be bypassed or otherwise operated without utilizing the correct input code.

Accordingly, an object of the present invention is to provide an improved anti-theft device for motor vehicles and other engine operated devices.

Another object of the present invention is to provide an anti-theft device which is mechanically and electrically tamperproof and which may not be bypassed or otherwise activated even by persons having an intimate knowledge with its design.

Another object of the present invention is to provide an anti-theft device which is easily inserted into existing vehicles and which requires no major modification of them.

A further object of the present invention is to provide a relatively inexpensive and completely reliable anti-theft device for motor vehicles.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings forming a part of the specification, wherein:

FIG. 1 is a perspective view of a preferred embodiment of the anti-theft device in accordance with the present invention.

FIG. 2 is a vertical sectional view of the preferred electrically actuated fuel shutoff valve coupled to the fuel inlet of a conventional internal combustion engine carburetor taken along line 2—2 on FIG. 1.

FIG. 3 is a vertical sectional view of the valve taken along line 3—3 on FIG. 2.

FIG. 4 is a vertical sectional view of the shutoff valve corresponding to FIG. 2 but showing the valve inlet fitting removed from the valve body and showing the shutoff valve in its closed position.

FIG. 5 is a fragmentary perspective view illustrating the lock stator portion of the shutoff valve and adjacent portions of the valve body and the valve inlet fitting.

FIGS. 6 and 7 are electric schematic diagrams illustrating the coded electrical control system for the shutoff valve.

DESCRIPTION OF THE PREFERRED EMBODIMENT

Figure 7:
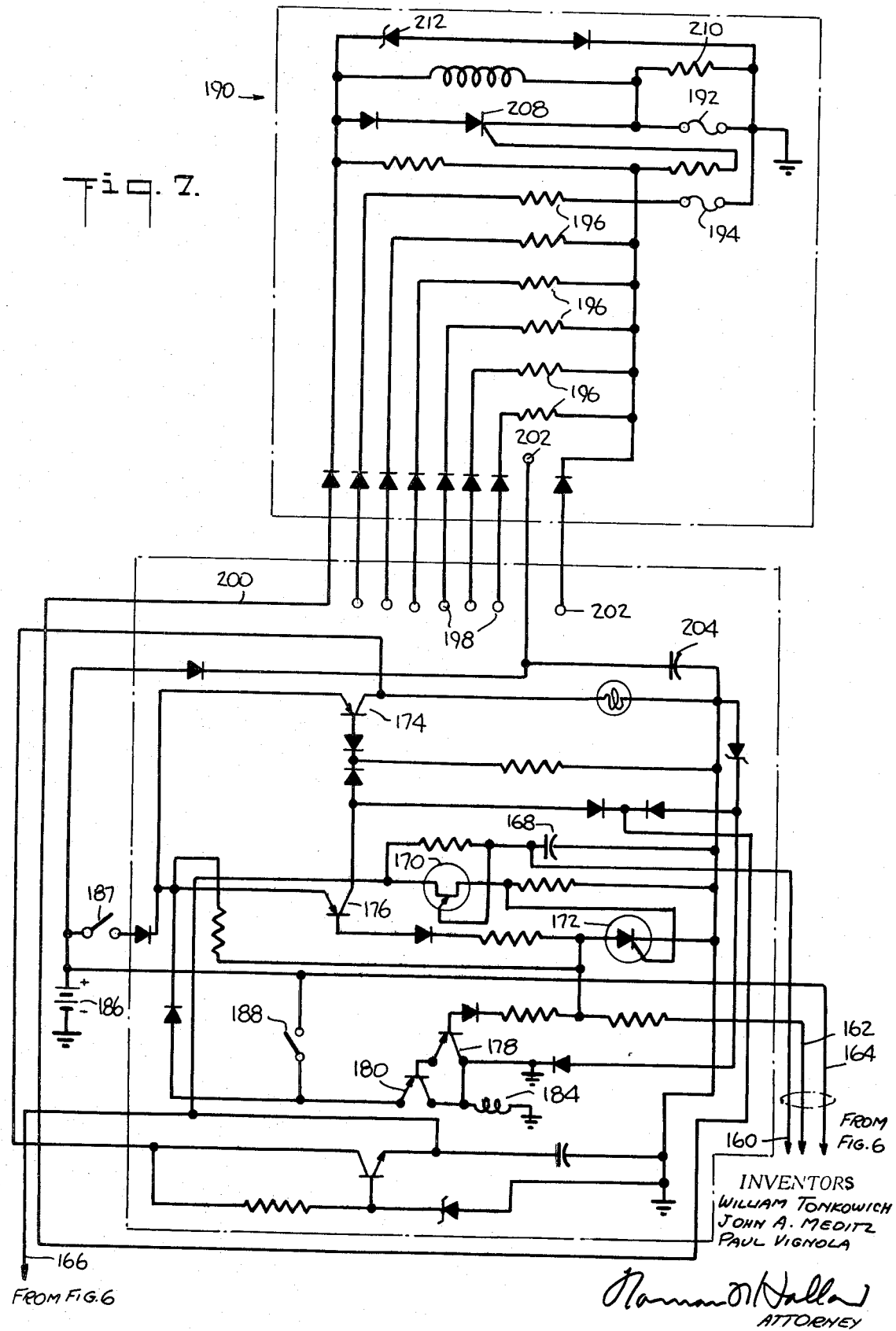

The anti-theft system will first be described in a general way with particular reference to the perspective showing of the system in FIG. 1.

FIG. 1 illustrates a conventional carburetor 1 for an internal combustion engine of a motor vehicle or of any other motor operated device to which fuel is fed through a fuel feed line 2. In conventional vehicles, this fuel line 2 is connected directly to the inlet port 3 of the carburetor 1 so that the gasoline or other fuel is fed directly into the carburetor 1 while the engine is in operation.

In the present invention, a tamperproof fuel shutoff valve 4 is inserted between the carburetor inlet port 3 and the fuel line 2. As will be described in greater detail below, this shutoff valve 4 includes a valve stem 5 (FIG. 2) which is held open during vehicle operation by a code actuated electrical control system. This device includes an electric solenoid 6 on the shutoff valve 4 for opening the valve stem 5 and a code or control box 7 accessible to the vehicle operator for selectively energizing the coil and which is connected to the solenoid 6 by a shielded and tamperproof cable 8.

The control system is operated in the following manner by the vehicle operator. The regular vehicle ignition key 9 is first used to energize the vehicle ignition system and the anti-theft control device. Turning the ignition key 9 supplies power to the code control box 7 and the vehicle operator now inserts a predetermined operating code into the code box 7 by pushing a number of code buttons on the box 7 in predetermined order. The code box 7 is set up in accordance with the present invention to require a code of several numbers, such as four or five for example, to be entered into the code box 7 with the code buttons being pressed in the exact order to the coded number. When this is done, the control solenoid 6 on the shutoff valve 4 is energized to move the valve stem 5 to its open position to admit fuel in the normal manner into the carburetor 1. The engine starter system can now be energized when the switch 9 is moved to its engine starting position. If the wrong code is inserted or if the order of the code numbers is changed, the code box 7 does not transmit current through the connecting cable 8 to the control solenoid 6.

As will be more fully described in the following description of the electrical system, all of the critical electrical elements and cable wires are embedded in epoxy and are otherwise electrically and mechanically protected to prevent the electrical system from being bypassed or otherwise energized in any manner independently of correctly inserting the present code into the code box 7.

The shutoff valve 4, as will also be more fully described below, is designed so that it cannot be removed from the carburetor 1 by unauthorized personnel without damaging the carburetor 1 except by the use of a second code which operates a coded mechanical lock 10 on the shutoff valve 4.

Means is also provided to temporarily place the vehicle under the control of the ignition key 9 for use by parking lot attendants, etc. This means must be set up using the regular system code so that it is available only to authorized operators.

THE ELECTRICALLY ACTUATED FUEL SHUTOFF VALVE

As indicated above, in the general description of the anti-theft device, the shutoff valve 4 is provided in the motor fuel supply line 2 to cut off fuel flow except when the valve 4 has been opened through the use of the code controlled electrical system of the device. In addition, the shutoff valve 4 is arranged so that there is no way to mechanically disconnect it or to bypass it without destroying the carburetor or without removing it using a mechanical coded valve uncoupling lock 10 provided as an integral portion of the shutoff valve 4. A preferred embodiment of the shutoff valve 4 will now be described with particular reference to FIGS. 2 through 5.

The valve 4 has a body 11, best illustrated in FIG. 2, which includes a threaded outlet fitting 12 which is coupled to the carburetor inlet 3 and which is provided with a central bore 14 which extends through generally a cylindrical magnetically insulating nonferrous portion 15 and a coupling portion 16. The solenoid plunger valve stem 5 is slidably mounted within the bore 14 for movement between an open position as illustrated in FIG. 2 and a closed position as illustrated in FIG. 4. The valve stem 5 is moved to its right-hand or open position when the surrounding solenoid 6 is energized and in this position fuel is seen to pass freely through the central port 17 in the valve stem 5 and through a plurality of angularly positioned outlet ports 18 and over a circular valve seat 19 and through a valve seat opening 20 into the carburetor inlet port 3. When the solenoid 6 is deenergized by the electrical control system, the valve stem 5 moves to the left under the force of a coil spring 21 thereby cutting off the fuel flow to the carburetor 1. In this condition, no additional fuel may reach the carburetor and the amount of fuel in the carburetor 1 will only run the vehicle engine for a matter of seconds thereby preventing unauthorized movement of the vehicle in the event the starter system is bypassed.

The solenoid 6 comprises an iron or magnetic frame consisting of a circular frame 22 with end pieces 23. The solenoid turns illustrated generally at 24 are embedded in an insulating medium such as epoxy. An outer framework or casing 25 is provided for the solenoid 6 which includes a hollow upper portion 26 in which certain of the electrical elements, as described below, may be mounted and may also be embedded and concealed within a poured-in epoxy or other embedding material.

The above described valve body 11 is first coupled to the carburetor 1 by being screwed into the inlet port 3 using suitable wrench flats 27 provided at the outer end of the body coupling portion 16. A protective collar 28 is first slipped over the valve body 11 to the position illustrated in FIG. 2. The purpose of the collar 28 is to provide a rotatable element of this exposed portion of the body 11 to prevent a valve removing tool from being applied at this point to remove the body 11 from the carburetor 1. Thereafter, the solenoid assembly 6 is slipped over the valve body 11 to the position indicated. Since the solenoid assembly is also free to rotate on the valve body, it cannot be used to disengage the valve body 11 from the carburetor 1. The grounding of one end of the solenoid coil 24 through fuse 192 (FIG. 7), as more fully described below, is accomplished by a current path from coil 24 to the coil frame to the valve body 11 with a compressed conical metal washer 28' insuring the electrical contact between body 11 and coil frame members 22 and 23.

As indicated above, the valve body 11 is attached to the carburetor 1 using a wrench or other tool on the flats 27 provided on the end of the body coupling portion 16. These flats 27 are now made inaccessible and unavailable for removal of the valve by a shielding and locking means covering that portion of the shutoff valve 4 as will now be described.

This shielding means includes a first hollow lock stator 30 which includes a series of locking balls 31 fitted in apertures 32 on its inner end. These balls 31 drop into a locking groove 33 on the body coupling portion 16 of the valve 4. When these balls 31 are pressed radially inwardly by a ring-like coupling sleeve 34, it is seen that the lock stator 30 is permitted to rotate on the body coupling portion 16 but cannot be withdrawn from it. A coil spring 35 holds the coupling sleeve 34 in the locking position illustrated in FIG. 2.

In order that the coupling sleeve 34 may only be moved by authorized persons to its unlocking position to release the balls 31, as shown in FIG. 4, a series of ring-like lock tumblers 36 are rotatably mounted outwardly of the lock stator 30 on the inner end 37 of an inlet fitting 38. The tumblers 36 are held in place by a retaining ring 39. Suitable spacing rings 40 are provided to facilitate rotation of the tumblers 36 around the end portion 37 of the inlet fitting 38.

As seen in FIG. 5, the cylindrical portion of the lock stator 30 includes a radially extending locking lug 41 so that each of the three lock tumblers 36 must have their release slots 42 (FIG. 3) properly aligned to permit the tumbler and inlet fitting assembly 36,38 to be slipped clear of the coupling sleeve 34 in the manner illustrated in FIG. 4. Coupling sleeve 34 may now be pressed rearwardly to clear balls 31.

FIG. 3 shows one of the tumblers 36 in cross section and it also shows a detent spring 43 which engages radial grooves 44 in the inlet fitting 38 to provide a stepped feel or pick-proof action during tumbler 36 rotation. A relatively large number of notches 45 corresponding to code numbers 46, are provided on the tumblers 36 as, for example, 20 or more. This means, for example, that there will be as many as eight thousand or more possible combinations which would have to be tried by an unauthorized person in order to remove the shutoff valve 4 from the carburetor 1.

The fuel line 2 is coupled to the valve 4 by means of an inlet fitting 47. This fitting 47 cannot be used to disengage the valve 4 as it will rotate on the valve body 11 along with the above described rotatably mounted lock stator 30.

It is therefore seen that there is no means for obtaining unauthorized external or internal access to the shutoff valve 4 by any means which will permit the valve 4 to be removed from the carburetor 1. If the shutoff valve 4 is physically wrenched or otherwise torn off of the carburetor 1, the carburetor casing and other parts will be damaged so that the fuel system will no longer function.

SEQUENTIALLY CODED ELECTRONIC LOGIC

FIG. 6 illustrates a preferred embodiment of the logic 103 for "locking" and "unlocking" the motor vehicle ignition system. The input code switches correspond to the single pole spring return switches, 91, 92, 93, 94, 95, 96, 97 and 98. In order to start the motor vehicle the operator must first turn the ignition to the "on" position which closes switch 187 and then input a code sequence which is 95, 94, 93, 92, 91 for the circuit of FIG. 6. Any other five number sequence will not start the motor vehicle.

Upon turning the ignition key 9 to the ignition state, flip-flops 100, 102, 104, 106 and 108 are in a state in which all of the "Q" outputs are low while all of the "$\overline{Q}$" are high. AND gate 110 takes its inputs from the "Q" outputs from 100, 102, 104, 106 and 108 so that AND gate 110 can only have a high output when all of the flip-flops 100, 102, 104, 106 and 108 have changed their states. AND gate 112 takes its inputs from the "$\overline{Q}$" outputs of the flip-flops 100, 102, 104 and 106. While AND gates 114, 116, 118 and 120 take some, but not all of their inputs from the "Q" outputs of flip-flops 100, 102, 104 and 106. As a result, only AND gates 112 has a high output while AND gates 114, 116, 118 and 120 have low outputs.

AND gates 114, 116, 118 and 120 are coupled to NAND gates 124, 126, 128 and 130, respectively, and each NAND gate will have a high output as long as one of its respective inputs is low. The high output of AND gate 112 is coupled over to NAND gate 122 and the output from NAND gate 122 will remain high until both of its inputs go high. The outputs from NAND gates 122, 124, 126, 128 and 130 are coupled to AND gate 132 and since all of the inputs to AND gate 132 are high, the output of AND gate 132 is also high. The high output from AND gate 132 is coupled to inverter 134 and NAND gate 138. The output of inverter 134 is low for a high input and is coupled to NAND gate 136. The output of NAND gate 136 is high when one of its inputs is low and NAND gate 136 is coupled to inverter 140. The output of inverter 140 is low and is coupled to the "D" input of flip-flop 100. The high output of NAND gate 136 is also coupled to the "C" inputs of flip-flops 100, 102, 104, 106 and 108. A change of state from low to high of the "C" input to the flip-flop's will cause a transfer of the state on input "D" to the output "Q". The "S" or set input to the flip-flops is maintained high with battery 186.

The six inputs of NOR gate 144 are initially all low so that the output of NOR gate 144 is high. This high output is coupled to buffer amplifiers 146, 148, 150, 152 and 154, respectively, in order to obtain a time delay. The output of buffer amplifier 154 is coupled to NOR gate 156 so that the output of NOR gate 156 is high for a low input and low for a high input. The high input to NOR gate 156 on this point results in a low input to multivibrator 158 and the "Q" output from multivibrator 158 is low and that low is coupled to NAND gates 138 and 136. The output from NAND gate 138 is high for an input which is low and this output is coupled to the reset ("R") input of flip-flops 100, 102, 104, 106 and 108 so that a change in state of the output of NAND gate 138 results in all of the flip-flop's being reset. In addition, the output of NAND gate 138 is coupled to inverter 142 which results in a low output which is available for use in an error indicating system or alarm system to indicate a change in state in the output of NAND gate 138. The output of NAND gate 138 only changes on the occurrence of an improper input code.

The temporary closing of switch 95 is the proper initial input to the logic system 101 but an improper input will be considered first. A closure of switches 91, 92, 93, or 94 results in the equivalence of electrical operations for logic system 101 because NAND gates 124, 126, 128 and 130 are of equivalent in that they each have a low input from AND gates 114, 116, 118 and 120, respectively. Assume that switch 91 is momentarily closed so that line 166 which is continued in FIG. 7 places a high from the regulated voltage on the emitter of transistor 161 on the line from switch 91 which goes to NAND gate 130 and NOR gate 144. The high input to NAND gate 130 does not change the output of this NAND gate due to the presence of the low input from AND gate 120 so that none of the logic elements connected to NAND gate 130 undergo a change in state, however, the high input to NOR gate 144 causes the output of NOR gate 144 to go low and this low output is time delayed by amplifiers 146, 148, 150, 152 and 154 and then inputted to NOR gate 156.

The low input to NOR gate 156 results in a high input to multivibrator 158. Multivibrator 158 produces a pulse output which goes to NAND 138 and NAND gate 138 then has two high inputs so that its output goes low for the duration of the pulse input. The low output of NAND gate 138 results in a high output from 142 and the change of state in the output of NAND gate 138 resets flip-flops 100, 102, 104, 106 and 108.

Switches 96, 97 and 98 are electrically tied together and closure of either one produces a high input to NOR gate 144. The high to NOR gate 144 causes a low output which after being delayed by amplifiers 146, 148, 150, 152 and 154 causes a low input to NOR gate 156 and then a high input to multivibrator 158. Multivibrator 158 puts out a high pulse which goes to NAND gate 138 so that NAND gate 138 has two high inputs and generates a low output during the period of the multivibrator 158 pulse. The change of state on the output of NAND gate 138 resets flip-flops 100, 102, 104, 106 and 108.

It is clear that a switch closure out of sequence or in a prewired group of 96, 97 and 98 results in a reset of the five flip-flops. Assuming that switch 95 has been depressed, the above described sequence of operations result in the "Q" of flip-flop 100 going high while the "Q" output of flip-flops 102, 104, 106 and 108 remain low. Under this condition the "$\overline{Q}$" output of flip-flop 100 is low so that AND gate 112 has a low output. AND gate 114 takes its inputs from the "Q" of flip-flop 100 which is high and the "$\overline{Q}$" outputs of flip-flops 102, 104 and 106 which are also high so that AND gate 114 has a high output. AND gates 116, 118 and 120 have low outputs because they are connected to the "Q" output of flip-flop 102 which is low. AND gate 114 is connected to NAND gate 124 and this NAND gate has an input connected to switch 94. Closure of switch 94 places a high on the input to NAND gate 124 and the presence of two highs results in a low output to AND gate 132 and AND gate 132 in turn provides a low output to inverter 134 and NAND gate 138. The low on NAND gate 138 prevents a change in state in the output of NAND gate 138 regardless of what the other input state to the NAND gate.

Inverter 134 has a high output which goes to NAND gate 136 and NAND gate 136 also has a high input from multivibrator 158 as a result of a high input to NOR gate 144 from switch 94. The two high inputs to NAND gate 136 produce a low output which goes to the "C" input of all of the flip-flops and to inverter 140. The output of inverter 140 places a high on the "D" input of flip-flop 100.

The end of the pulse from the multivibrator 158 causes the output of NAND gate 136 to go from low to high. The time delay caused by inverter 140 maintains the high on input "D" of flip-flop 100 a short interval longer while the time it takes input "C" of flip-flop 100 to change from low to high. That time interval is sufficient to cause a transfer of the state of "D" on flip-flop 100 to the "Q" output of flip-flop 100. The high which had been on the "Q" output of flip-flop 100 is also an input to "D" of flip-flop 102 and the output of NAND gate 136 is also connected to the "C" input of flip-flop 102. Hence, the high on the "D" input of flip-flop 102 is transferred to the "Q" output of flip-flop 102 during the change of state in the "C" input of flip-flop 102. At this point, flip-flops 100 and 102 have highs on the "Q" outputs and flip-flops 104, 106 and 108 have lows on the "Q" outputs.

NAND gate 116 takes its inputs from the highs of flip-flops 100, 102, 104 and 106 so that its output is also high. AND gates 112, 114, 118 and 120 have low outputs. AND gate 116 is coupled to NAND gate 126. Closure of switch 3 which is the next sequential switch places a high on the input of NAND gate 126 and NOR gate 144 and results in a low output from both NAND gate 126 and NOR gate 144. AND gate 132 responds to the low input by changing its output to low so that the input to NAND gate 138 is low and the output of inverter 134 is high. Meanwhile, the low output from NOR gate 144 has been delayed in time by amplifiers 146, 148, 150, 152 and 154 and subsequently NOR gate 156. The output from NOR gate 156 is high and multivibrator 158 puts out a high pulse to NAND gates 136 and 138. The output of NAND gate 138 remains high due to the presence of the low output from AND gate 132. NAND gate 136 goes low due to the two high inputs. This low is inputted to the "C" inputs of flip-flops 100, 102, 104, 106 and 108 and a short time later due to inverter 140 a high is placed on the "D" input to flip-flop 100. The termination of the pulse output from multivibrator 158 results in a change of state in the output of NAND gate 136 which causes the "C" inputs to the flip-flops to go from low to high with the resulting transferred to the corresponding "D" inputs to the respective "Q" outputs. The result is that the "Q" outputs from flip-flops 100, 102 and 104 are high while the "Q" outputs from flip-flops 106 and 108 remain low.

Closure of switches 92 and 91 in that order will essentially repeat the above described process and result in all of the "Q" outputs of the flip-flops to go high. AND gate 110 takes its inputs from the 'Q" outputs of the flip-flops and will result in a high output on line 160 for the proper code sequence. Line 160 continues to FIG. 7 to capacitor 168 and results in that capacitor becoming charged. After capacitor 168 has become charged unijunction transistor 170 outputs a pulse to SCR 172. The output from SCR 172 turns on transistors 176, 178 and 180 and turns off transistor 174. Indicator light 182 turns off to indicate the proper code sequence has been entered. Transistor 180 acts as a switch in a series with ignition coil 184, battery 186 and starter switch 188. When transistor 180 is turned on it permits battery excitation of the starter coil so that the motor vehicle can be started.

Closing switch 99, which is a lock-in switch, after the proper switch sequence has been entered places battery voltage 186 on SCR 172 through a resistor 173 so that even though the ignition of the vehicle motor is turned off, SCR 172 will continue to conduct so that the motor vehicle can be started without re-entering the sequence code. Starter switch 188 is in series with battery 186 so that power is not supplied to ignition coil 184 even though transistor 180 is on.

ELECTRICAL CIRCUIT FOR TRANSFER PROOF CUTOFF VALVE

Solenoid coil 24 of the valve is epoxy encapsuled in circuit configuration 190 which includes current limiting fuses 192 and 194 along with resistors 196 which have approximately the same value of resistance as the solenoid coil 24. The inputs 198 are all bogus lines which will burn out fuse 194 for an excessive current input. Only line 200 will bring excitation to solenoid coil 24. Lines 202 and 204 correspond to the cable shield containing the lines 200 and 198.

The lines 198 and 200 are individual strands of wire being electrically insulated from each other while also being physically identical in size, appearance and composition. The outer coating of the cable 8 containing the lines is connected through lines 204 to fuse 194 and then to ground. The inner braided copper shield is connected to line 202 which goes to capacitor 204. The inner and outer braided copper shields of cable 8 are insulated from each other and the outer jacket of the cable is provided with a pressure extruded flexible non-conductive material which serves to insulate and protect the cable from pressures, chemicals and temperature extremes.

In order for someone to apply power to coil 24, the cable jacket of cable 8 must be penetrated and power must be applied to line 200. If power is inadvertently applied to line 198, fuse 194 will burn out and no further attempts to apply power will permit excitation of coil 24.

After the motor vehicle has been operated and power to the system has been turned off, capacitor 204 will retain a voltage because it has a low loss and high capacitance. If an attempt is made to cut through the cable jacket while capacitor 204 retains a substantial voltage, the shorting of the two copper braiding conductors is equivalent to interconnecting capacitor 204 on line 202 to line 204. This will cause fuse 194 to burn out. If after burning fuse 194, further attempts are made to power line 200, fuse 192 will burn out because the fuse 194 burned out SCR 208 will go into conduction and short out coil 24. SCR 208 is in parallel with coil 24 and is maintained in the non-conductive state through fuse 194 and will remain that way as long as fuse 194 is intact. Resistor 210 is in parallel with fuse 192 and maintains valve 4 in the opened position should fuse 192 burn out for any reason during the normal operation of the motor vehicle. Zener diode 212 is used to suppress transients.

The value of fuse 194 is chosen so that it will burn out when the minimum amount of current that is required to energize coil 24 is applied to any one of the lines 198. The value of fuse 192 is chosen to be sufficiently large to handle all the current requirements of coil 24.

The ratio of expected or normal current flow through fuse 194 to the burn out current resulting from a tampering with the electrical circuit is of the order of 1 to 100 so that there is virtually no chance of an inadvertent burn out of this fuse 194 during normal operations.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. An anti-theft valve for fluid fuel operated engine apparatus comprising the combination of a valve body having means for attaching it to the engine fuel inlet, a mechanical shielding means surrounding said body for preventing removal of said body from the fuel inlet, a flow control valve stem movably mounted in said body, electrical means in said valve for moving said stem, and a lock releasably coupling said body and said shield.

2. The valve as claimed in claim 1 in which said lock comprises a mechanical combination lock.

3. The valve as claimed in claim 1 in which said electrical stem moving means comprises a solenoid.

4. The valve as claimed in claim 1 in which said body comprises a generally cylindrical member having a cylindrical bore, said stem comprising a generally cylindrical member slidably mounted in the bore, and said electrical stem moving means comprising an annular solenoid surrounding said body outwardly of said stem.

5. An anti-theft device for fluid fueled engine driven apparatus comprising the combination of:
    a valve adapted for insertion into the engine fuel feed line;
    an electrical means on said valve for operating it;
    a source of electric power;
    and said source of electric power having its output controlled by an electronic logic circuit whose output is controlled by sequentially addressing a plurality of logic circuit inputs in preselected order;
    a cable coupling said logic circuit output to said electrical means on said valve; and
    said cable including a plurality of dummy conductors with fuse means coupled to said dummy conductors.

6. The device as claimed in claim 5 in which said engine includes an electrically controlled starting device coupled to said source of electric power whereby said starting device is controlled by said logic circuit.

7. The device as claimed in claim 5 in which said source of electric power includes voltage clamping means to selectively maintain electric power on said valve operating means after the logic circuit is deenergized.

8. An anti-theft device for fluid fueled engine driven apparatus comprising the combination of:
    a valve adapted for insertion into the engine fuel feed line;
    an electrical means on said valve for operating it;
    a source of electric power;
    and said source of electric power having its output controlled by an electronic logic circuit whose
    output is controlled by sequentially addressing a plurality of logic circuit inputs in preselected order;
    a cable coupling said logic circuit output to said electrical means on said valve;
    said cable including a plurality of dummy conductors with fuse means coupled to said dummy conductors; and
    a resistor in each dummy line having a value generally equal to the resistance value of the resistance of the valve operating means.

9. The device as claimed in claim 8, in which said cable has a pair of conductive shields electrically isolated from each other.

10. The device as claimed in claim 9 in which one of said shields is coupled to a capacitor for storing a fuse destroying charge.

11. An anti-theft device for fluid fueled engine driven apparatus comprising the combination of:
    a valve adapted for insertion into the engine fuel feed line;
    an electrical means on said valve for operating it;
    a source of electric power;
    and said source of electric power having its output controlled by an electronic logic circuit whose output is controlled by sequentially addressing a plurality of logic circuit inputs in preselected order;
    a cable coupling said logic circuit output to said electrical means on said valve;
    said cable including a plurality of dummy conductors all coupled to ground through a common fuse; and
    said valve operating means being coupled to ground through a second fuse.

* * * * *